United States Patent
Nemawarkar et al.

(10) Patent No.: US 12,293,086 B2
(45) Date of Patent: May 6, 2025

(54) APPARATUS AND METHOD FOR PROVIDING HIGH THROUGHPUT MEMORY RESPONSES

(71) Applicant: GLOBALFOUNDRIES U.S. Inc., Malta, NY (US)

(72) Inventors: Shashank Nemawarkar, Austin, TX (US); Bipul C. Paul, Mechanicville, NY (US)

(73) Assignee: GLOBALFOUNDRIES U.S. Inc.

( * ) Notice: Subject to any disclaimer, the term of this patent is extended or adjusted under 35 U.S.C. 154(b) by 90 days.

(21) Appl. No.: 18/315,696

(22) Filed: May 11, 2023

(65) Prior Publication Data

US 2024/0377954 A1  Nov. 14, 2024

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| | | | |
|---|---|---|---|
| 6,330,645 B1 * | 12/2001 | Harriman | G06F 13/1626 711/147 |
| 6,415,353 B1 * | 7/2002 | Leung | G11C 11/40618 711/E12.041 |
| 9,817,763 B2 | 11/2017 | Robertson et al. | |
| 10,331,582 B2 | 6/2019 | Bhati et al. | |
| 11,587,601 B1 | 2/2023 | Paul et al. | |
| 11,645,007 B2 * | 5/2023 | Yoon | G06F 3/061 711/103 |
| 2010/0211746 A1 * | 8/2010 | Tsukishiro | G06F 12/0804 711/143 |
| 2018/0232311 A1 * | 8/2018 | Bhati | G06F 12/0811 |
| 2020/0133905 A1 * | 4/2020 | Mathews | G06F 13/18 |
| 2024/0036736 A1 * | 2/2024 | Anderson | G06F 3/0673 |

OTHER PUBLICATIONS

Microsemi, SmartFusion Microcontroller Subsystem User's Guide, 2011, pp. 1-400, Revision 3, Microsemi Corporation, Aliso Viejo, California.
Sarita V. Adve et al., Shared Memory Consistency Models: a Tutorial, WRL Research Report 95/7, Sep. 1995, pp. 1-28, Western Research Laboratory, Palo Alto, California.

* cited by examiner

*Primary Examiner* — Zhuo H Li (57) ABSTRACT

An apparatus and method for providing high throughput memory responses are provided. The apparatus includes a memory device including a plurality of memory arrays, a memory controller configured to control the memory device, the memory controller having a read queue, a write queue, and an address match circuit, and a data output circuit. The memory controller receives a read request, searches the write queue for a write address that matches a read address of the read request, and sends data associated with the write address from the write queue to the data output circuit without accessing the memory device when the write address matches the read address, the write address that matches the read address being a target address. The data output circuit outputs the data associated with the target address to an external device.

19 Claims, 7 Drawing Sheets

APPARATUS AND METHOD FOR PROVIDING HIGH THROUGHPUT MEMORY RESPONSES

BACKGROUND

Embodiments of the present disclosure relates to memory circuits, and more particularly, to an apparatus and method for providing high throughput memory responses to reduce a system response time.

Memory circuits, such as random-access memory (RAM), are important to the operation of integrated circuits (ICs). Memory circuits include an array of memory cells that can be read and/or written in any order and can store data or machine code for a device. Some types of RAM (e.g., static RAM) include a "volatile" form of memory (i.e., volatile memory) that requires power to maintain the stored information, and a "non-volatile" form of memory (i.e., non-volatile memory) that can maintain the stored information even when no power is supplied to the device. However, the non-volatile memory typically is slower in processing read and write requests than the volatile memory. Accordingly, the non-volatile memory has been used sparingly in systems that prioritize the response speed.

SUMMARY

Embodiments of the present disclosure are directed to an apparatus and method for providing high throughput memory responses to reduce a system response time and thus improve system performance.

In an embodiment, an apparatus includes a memory device including a plurality of memory arrays, a memory controller configured to control the memory device, the memory controller having a read queue, a write queue, and an address match circuit, and a data output circuit. The memory controller is configured to receive a read request, search the write queue for a write address that matches a read address of the read request, and send data associated with the write address from the write queue to the data output circuit without accessing the memory device when the write address matches the read address, the write address that matches the read address being a target address. The data output circuit is configured to output the data associated with the target address to an external device.

In another embodiment, a method includes receiving a read request by a memory controller, the memory controller having a read queue and a write queue, the memory controller being coupled to a memory device and a data output circuit, searching the write queue for a write address that matches a read address of the read request, and sending data associated with the write address from the write queue to the data output circuit without accessing the memory device when the write address matches the read address.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Embodiments of the present disclosure provide a memory controller for providing high throughput memory responses to reduce a response time, a memory system including the memory controller, and an operating method thereof. Embodiments of the present disclosure may be particularly suitable for non-volatile memory, and/or other applications where comparatively longer processing time is needed to complete a read or write operation. In an embodiment, read and write requests to a memory device are queued before performing a read or write operation. When an address corresponding to that of a read request is found in the queued write requests, data is read out from the queued write requests rather than from the memory device itself. As used herein, such a read operation is referred to as a "bypass mode" or an "out-of-order" service.

Figure 1:
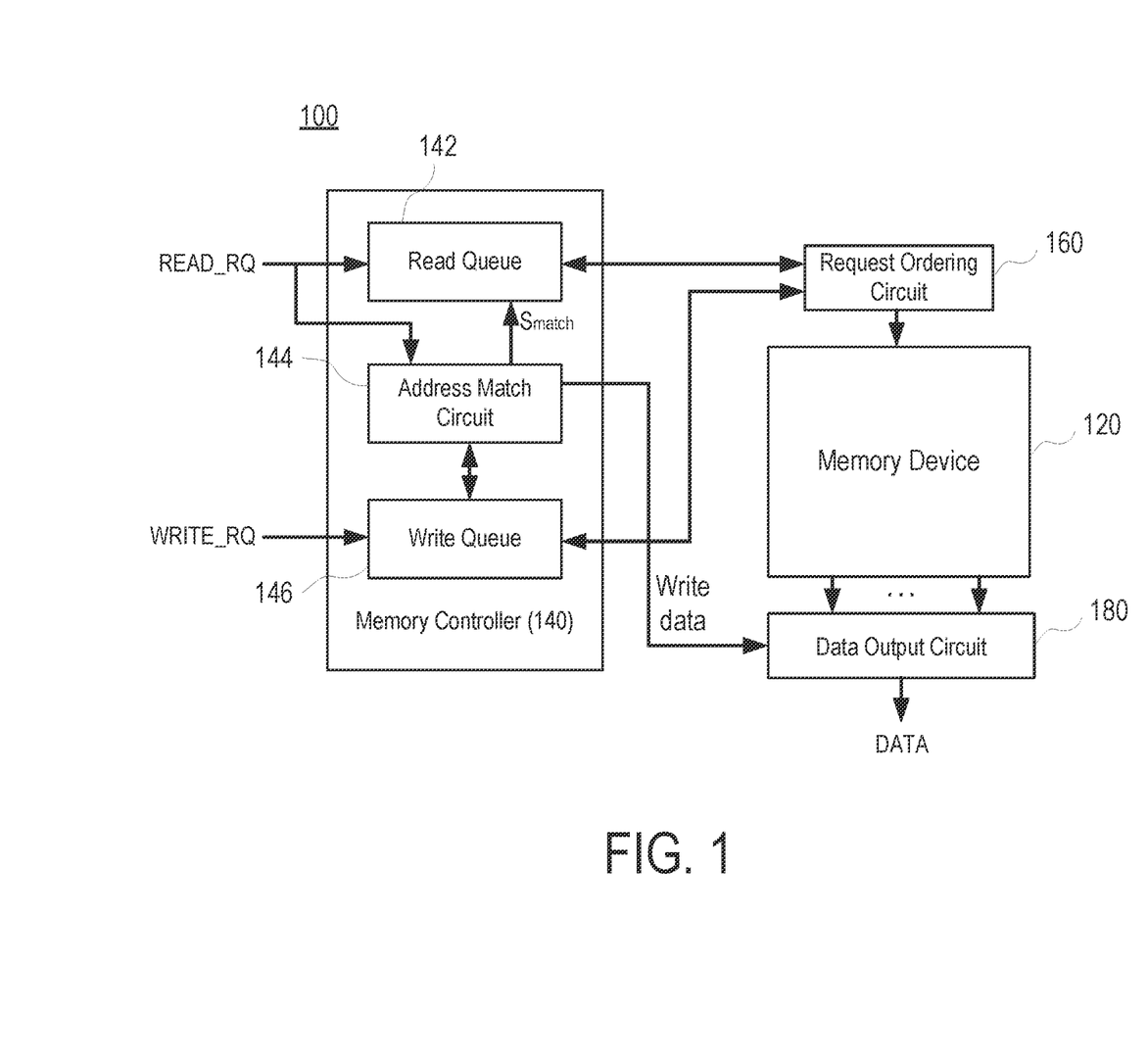
FIG. 1 illustrates a memory system according to an embodiment of the present disclosure.

FIG. 1 illustrates a memory system 100 according to an embodiment of the present disclosure. The memory system 100 includes a memory device 120, a memory controller 140, a request ordering circuit 160, and a data output circuit 180. In another implementation, the memory controller 140, the request ordering circuit 160, and the data output circuit 180 may be integrated in one or two components. For example, the request ordering circuit 160 may be included in the memory controller 140.

The memory device 120 may include a plurality of memory units. The memory device 120 receives read or write requests from the request ordering circuit 160 and performs read or write operations corresponding to the requests received in the memory units.

The memory controller 140 may receive requests from multiple sources. The memory controller 140 may include a read queue 142, an address match circuit 144, and a write queue 146.

The read queue 142 receives read requests READ_RQ for the memory device 120. The read requests READ_RQ may be received from multiple sources. The read queue 142 temporarily stores the read requests READ_RQ before transmitting the read requests READ_RQ to the memory device 120 in which read operations corresponding to the read requests READ_RQ are to be performed. A read request READ_RQ may include a read command for a read operation and a read address designating a memory region on which the read operation is to be performed. In some embodiments, the read request READ_RQ may further include one or more of a request identifier (ID), a barrier tag, a barrier bit, etc. For example, when the read request READ_RQ is with the barrier tag, i.e., when the read request READ_RQ is a barrier request, it may indicate that all requests received before the read request READ_RQ need to be completed before the read request READ_RQ is processed. The barrier bit may be used to indicate that the read request READ_RQ is the barrier request.

The write queue 146 stores write requests WRITE_RQ for the memory device 120. The write request WRITE_RQ may be received from multiple sources. The write queue 146 temporarily stores the write requests WRITE_RQ before transmitting the write requests WRITE_RQ to the memory device 120 in which write operations corresponding to the write requests WRITE_RQ are to be performed. A write request WRITE_RQ may include a write command for a write operation, write data to be written, and a write address designating a memory region on which the write operation is to be performed. In some embodiments, the write request WRITE_RQ may further include one or more of a barrier tag, a barrier bit, etc. For example, when the write request WRITE_RQ is with the barrier tag. i.e., when the write request WRITE_RQ is a barrier request, it may indicate that all requests received before the write request WRITE_RQ need to be completed before the write request WRITE_RQ is processed. The barrier bit may be used to indicate that the write request WRITE_RQ is the barrier request.

In an embodiment, the address match circuit 144 is coupled to the read queue 142, the write queue 146, and the data output circuit 180. The address match circuit 144 receives a read request READ_RQ and searches the write queue 146 for a write request with a write address that matches a read address of the read request READ_RQ. If the address match is found, the write data in the write queue 146 corresponds to data to be read out from the memory device 120 in response to the read request READ_RQ.

In an embodiment, the address match circuit 144 compares a read address of a current read request READ_RQ with the write addresses of the write requests WRITE_RQ stored in the write queue 146 to determine the address match. In an embodiment, the current read request READ_RQ refers to a request being processed by the read queue 142.

In an embodiment, the memory controller 140 performs a bypass mode or an out-of-order service if the address match is found. In the bypass mode, the address match circuit 144 reads write data of the corresponding write request from the write queue 146 and transmits the data to the data output circuit 180. In another embodiment, when there is the address match, the address match circuit 144 instructs the write queue 146 to provide the write data of the corresponding write request to the data output circuit 180. The data output circuit 180 then outputs the data received from the address match circuit 144 or the write queue 146 to an external node as the read data DATA. In an embodiment, the data output circuit 180 receives the data with a read request identifier (ID) of the current read request READ_RQ from the address match circuit 144. The bypass mode enables the memory device 120 to increase its read response throughput since the current read request READ_RQ does not need to wait for the write request WRITE_RQ to complete its operation on the memory device 120.

In an embodiment, if there are two or more write requests with the write address that matches the read address of the current read request READ_RQ, the last input write request among the two or more write requests is determined as the corresponding write request.

In an embodiment, the address match circuit 144 provides a first match determination signal $S_{match}$ to the read queue 142 if an address match is found in the write queue 146 for the read address of the current read request READ_RQ. The first match determination signal $S_{match}$ is used to prevent the current read request READ_RQ from being performed twice. If the first match determination signal $S_{match}$ is received, the read queue 142 does not store the current read request READ_RQ in the read queue 142, so that the current read request READ_RQ will not be performed for the second time after the write data has been written in the memory device 120.

In another embodiment, the read queue 142 stores the current read request READ_RQ and deletes it if the first match determination signal $S_{match}$ is received to prevent the current read request READ_RQ from being performed twice.

The address match circuit 144 provides a second determination signal $S_{match}$ to the read queue 142 if the address match is not found in the write queue 146 for the current read request READ_RQ. The memory controller 140 performs the current read request READ_RQ in a normal mode. Under the normal mode, the read queue 142 stores the current read request READ_RQ in response to the second match determination signal $S_{match}$. The current read request READ_RQ is then sent to the memory device 120, so that data can be read out from the memory device 120.

The request ordering circuit 160 monitors the read queue 142 and the write queue 146 and determines the ordering (or processing priority) of the read requests READ_RQ and the write requests WRITE_RQ that are stored in the read queue 142 and the write queue 146, respectively. The read requests READ_RQ and the write requests WRITE_RQ are sent to the memory device 120 according to the priority determined by the request ordering circuit 160.

In an embodiment, the request ordering circuit 160 may be designed to prioritize the read requests READ_RQ over the write requests WRITE_RQ. In such an implementation, the request ordering circuit 160 delays the processing of the write requests WRITE_RQ and service the read requests READ_RQ during periods of high activity. In subsequent periods of low activity, the write requests WRITE_RQ accumulated in the write queue 146 can be opportunistically serviced.

However, if the write queue 146 is full or the number of write requests queued in the write queue 146 reaches a threshold value, the request ordering circuit 160 may change the processing priority. For example, the request ordering circuit 160 may alternate between sending a read request READ_RQ from the read queue 142 and sending a write request WRITE_RQ from the write queue 146, followed by sending a read request READ_RQ from the read queue 142. An advantage of this scheme is that, for workload execution regions that exhibit alternating periods of low and high read activities, the write queue 146 may buffer the write requests WRITE_RQ during the short burst of high read activity. During a subsequent period of low read activity, the write queue 146 may be drained of the write requests WRITE_RQ without causing any interference to the read requests READ_RQ buffered in the read queue 142.

In an embodiment, when the request ordering circuit 160 alternates in sending the read requests READ_RQ and the write requests WRITE_RQ, the request ordering circuit 160 may send a single write request followed by a single read request when the write queue 146 is full.

If the write queue 146 is not full or has not reached a threshold value, the request ordering circuit 160 may prioritize the read requests READ_RQ over the write requests WRITE_RQ, i.e., exhibits a first pattern. On the other hand, if the write queue 146 is full or has reached the threshold value, the request ordering circuit 160 alternates between sending a write request WRITE_RQ and a read request READ_RQ, i.e., exhibit a second pattern. The request ordering circuit 160 may selectively transmit the read requests READ_RQ and the write requests WRITE_RQ to the memory device 120 according to the first pattern or the second pattern based on available slots (or entries) in the write queue 146. However, embodiments are not limited thereto.

In other embodiments, the request ordering circuit 160 may transmit the read requests READ_RQ and the write requests WRITE_RQ to the memory device 120 according to another pattern to improve system performance based on other parameters such as latency, bandwidth, power efficiency, etc.

In an embodiment, if a newly incoming write request matches to an old write request stored in the write queue 146 and no barrier request exists between the old write request and the newly incoming write request, the old write request can be deleted from the write queue 146. In other words, when the two write requests, i.e., the older write request and the newly incoming write request following the older write request, are associated with the same address with no barrier request instructing the processing of the older write request therebetween, the newly incoming write request represents a current state of the memory system 100. Since a state represented by the older write request no longer represents the current state of the memory system 100 as the newly incoming write request is input, the older write request can be deleted. On the other hand, if there is the barrier request exists between the older write request and the newly incoming write request, the older write request is processed before the newly incoming write request is input.

In an embodiment, read and write requests queued in the read and write queues 142 and 146 each are processed according to an order that they are input to the read and write queues 142 and 146. The order may be identified by barrier tags included in the requests.

Figure 2:
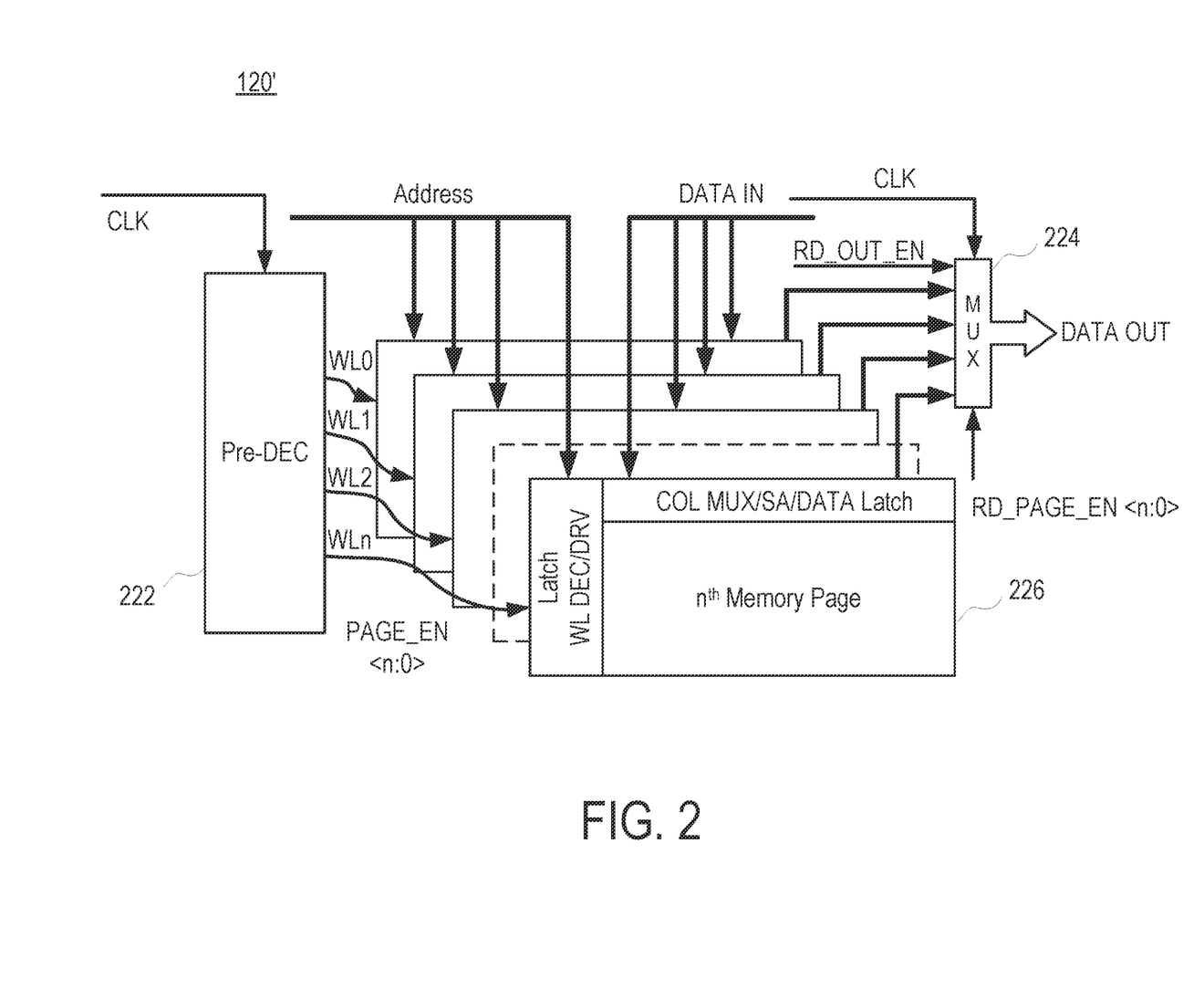
FIG. 2 illustrates a memory device according to an embodiment of the present disclosure.

FIG. 2 illustrates a memory device 120' according to an embodiment of the present disclosure. The memory device 120' may correspond to the memory device 120 shown in FIG. 1.

The memory device 120' may include a pre-decoder 222 (Pre-DEC in FIG. 2) coupled to a plurality of memory units 226 through a plurality of word lines, e.g., WL0, WL1, WL2, through WLn. The plurality of memory units 226 may correspond to a plurality of memory pages (or sub-arrays), e.g., $0^{th}$ memory page P0, 1st memory page P1, $2^{nd}$ memory page P2, through nth memory page Pn, respectively. In this case, the pre-decoder 222 may provide encoded page signals PAGE_EN<n: 0> to the plurality of memory pages P0, P1, P2, through Pn through the plurality of word lines WL0, WL1, WL2, through WLn, respectively.

A data bus within the memory device 120' is coupled to each of the plurality of memory pages P0, P1, P2, through Pn, but is omitted from FIG. 2 for illustrative convenience.

In an embodiment, the pre-decoder 222 is electrically coupled to the plurality of memory units 226 through respective word lines WL. Each word line WL can allow the pre-decoder 222 to access a respective memory unit 226 via control circuitry managed within the pre-decoder 222. In this configuration, a read or write pulse transmitted to the memory unit 226 can include a set of "least significant bits," or a "least significant byte" (both abbreviated LSB), for indicating an address of a particular memory page. As an example, each pulse for reading or writing data in the memory unit 226 may include a five-bit LSB to select from one of a range of thirty-two memory pages. A larger or smaller size LSB string can be used to select from different numbers of possible memory pages in other embodiments. Incoming signals to the pre-decoder 222 may include a combination of a command and addresses respectively designating an operation to be performed (reading or writing of data) and a particular memory region. The pre-decoder 222 can interpret the addresses within the incoming signals as particular memory pages where each read or write operation is to be performed.

Figure 3:
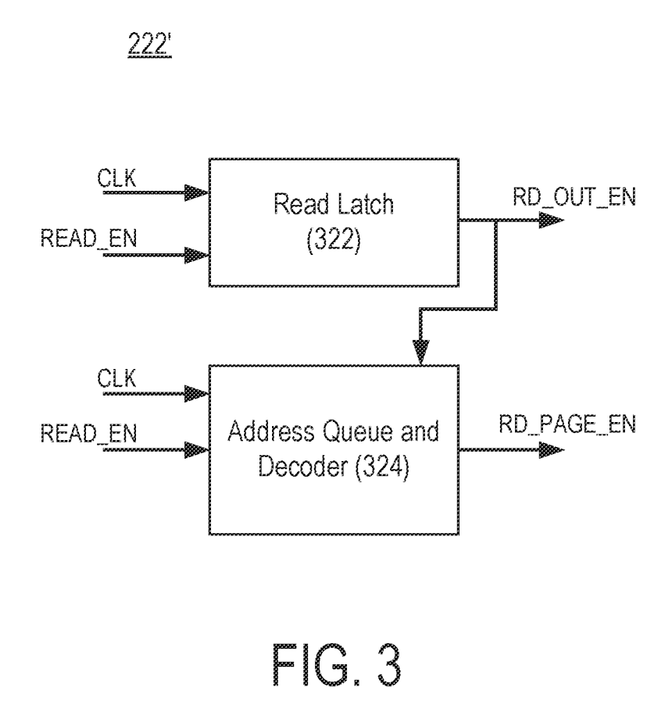
FIG. 3 illustrates a pre-decoder according to an embodiment of the present disclosure.

FIG. 3 illustrates a pre-decoder 222' according to an embodiment of the present disclosure. The pre-decoder 222' may correspond to the pre-decoder 222 shown in FIG. 2.

The pre-decoder 222' is an example of a digital circuit structure for implementing various functions described herein, and it is understood that additional and/or alternative functions may be used in other implementations.

Referring to FIGS. 2 and 3, the pre-decoder 222' may be used for partially decoding the incoming signals before their transmission to the memory unit 226. Specifically, the pre-decoder 222' may split an incoming encoded signal ("READ_EN" in the case of an encoded read signal) into two parallel encoded signals. Such signals may be identified as "RD_OUT_EN" to specify when the read data is available to the data bus after the read data is read out from a memory unit (page or sub-array). This signal RD_OUT_EN can be generated based on a predefined read latency known for a particular memory unit. The signal RD_PAGE_EN can be used to specify a sequence of memory unit addresses in which read is requested. These signals may be transmitted to a multiplexer ("MUX") 224 configured for routing read data from a selected memory unit to a sense amplifier or other component for measuring a memory state in the selected memory unit 226. Specifically, the signal RD_OUT_EN will control the multiplexer 224 based on whether the read data is available for routing through the data bus, and the signal RD_PAGE_EN will allow the multiplexer 224 to transmit relevant data to interconnected components in the correct order previously specified in the pre-decoder 222.

In an embodiment, the pre-decoder 222' receives a clock signal CLK to define a processing frequency of the pre-decoder 222' in parallel with the incoming encoded signal READ_EN. Both inputs, i.e., the clock signal CLK and the incoming encoded signal READ_EN may be delivered in parallel to two subcomponents of the pre-decoder 222', e.g., a read latch 322 and an address queue and decoder 324. The read latch 322 may temporarily store all or a portion of the incoming encoded signal READ_EN to indicate the order in which incoming signals were received to allow re-ordering as needed in the multiplexer 224. The address queue and decoder 324 may receive the signal RD_OUT_EN, the clock signal CLK, and the incoming encoded signal READ_EN to produce the signal RD_PAGE_EN. As noted elsewhere herein, the signal RD_PAGE_EN is an additional signal provided to the multiplexer 224 solely to indicate the correct reading or writing order of data in the memory unit 226. The pre-decoder 222' thereby produces two signals, to control the multiplexer 224 as the memory unit 226 is read, to avoid possible errors arising from data being read or written out of order.

Figure 4:
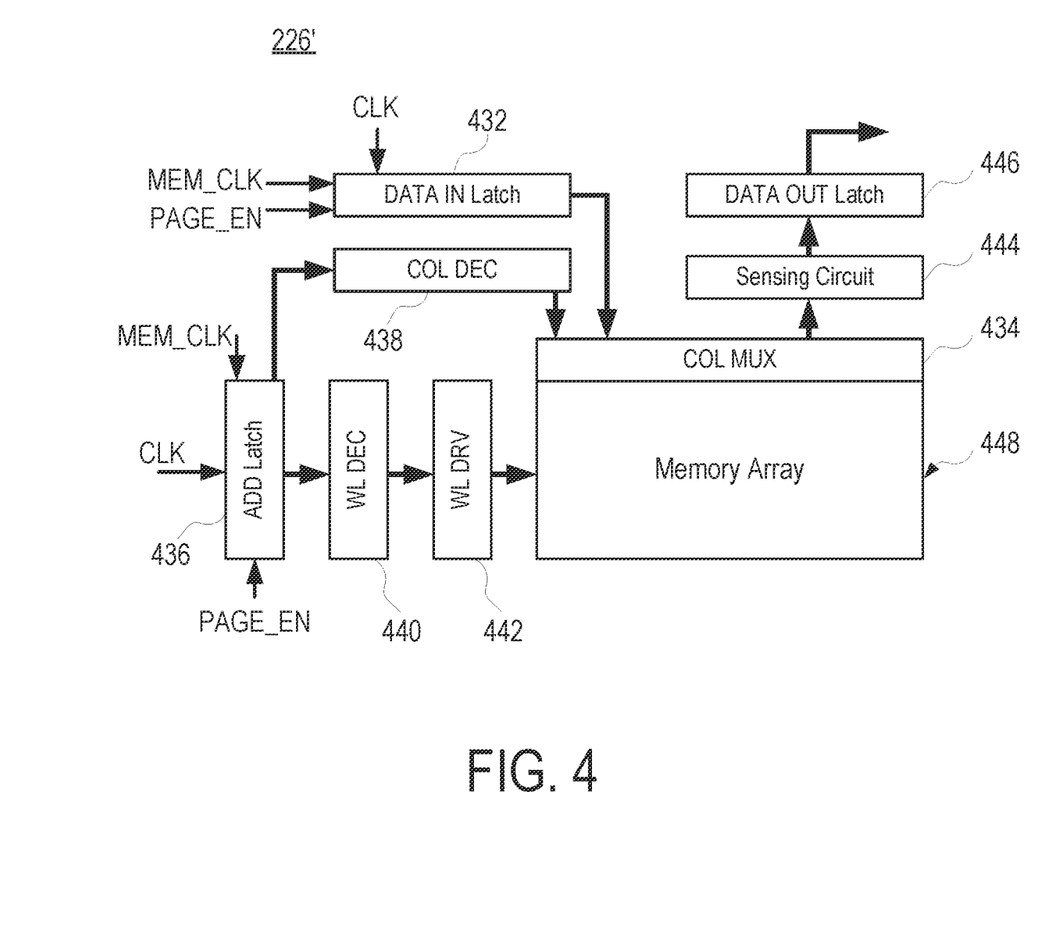
FIG. 4 illustrates a memory unit according to an embodiment of the present disclosure.

FIG. 4 illustrates a memory unit 226' according to an embodiment of the present disclosure. The memory array 226' may correspond to the nth memory unit 226 shown in FIG. 2. Although FIG. 4 illustrates the nth memory unit, the other memory units in the memory device 120 may have substantially the same configuration as the nth memory unit shown in FIG. 4.

In an embodiment, the memory unit 226' receives, as a memory unit selection signal, an encoded page signal PAGE_EN transmitted, e.g., from the pre-decoder 222 or 222' or other digital component(s) for producing such a signal. Additionally, the memory unit 226' may receive inputs in the form of a clock signal CLK and/or an internal memory clock signal MEM_CLK representing an incoming read pulse or write pulse from a pulse generator. The memory unit 226' may include, e.g., a data in latch (labeled "DATA IN Latch") 432 in the form of one or more latches for temporarily storing write data for write pulses since the write data cannot be immediately transmitted to a memory array 448. Thus, the data in latch 432 may include at least one temporary memory element for storing the write data that must be held temporarily before they can be transmitted to the memory array 448. To control when/whether the internal memory clock signal MEM_CLK must be held in the data in latch 432, the encoded page signal PAGE_EN may indicate whether memory region(s) specified in the internal memory clock signal MEM_CLK are available for reading or writing at a given time. The clock signal CLK may be transmitted to the data in latch 432 to control a processing speed for the data in latch 432. The data in latch 432 may be coupled to a column multiplexer (COL MUX) 434 for transmission of signals to a column where a target memory cell is located.

Other components of the memory unit 226' may control an address selection of the memory array 448 for reading or writing as defined in each read pulse or write pulse transmitted to the memory unit 226'. An address latch ("ADD Latch") 436 also may include one or more temporary memory elements, and may receive the clock signal CLK, the internal memory clock signal MEM_CLK, and the encoded page signal PAGE_EN in parallel with the data in latch 432. The address latch 436 operates by identifying the memory array 448. The temporary memory elements included in the address latch 436 may temporarily store bits indicating memory cells included in the memory array 448, to prevent data from being written to and/or read from the same memory cells simultaneously. To transmit a read or write pulse to a particular memory region, the address latch 436 may be coupled to a column decoder (COL DEC) 438 and the column multiplexer 434 to selectively enable memory cells coupled to a particular column for reading or writing.

A word line decoder (WL DEC) 440 and a word line driver (WL DRV) 442 can be coupled between the address latch 436 and the memory array 448 to enable a corresponding row of the nth memory array 448 for reading or writing. The column decoder 438 and the column multiplexer 434 may operate in tandem with the word line decoder 440 and the word line driver 442 to enable only the selected memory cell for reading or writing, pursuant to instructions included in the internal memory clock signal MEM_CLK. To allow reading of data in the memory array 448, a sensing circuit (e.g., sense amplifier) 444 may be coupled to the column multiplexer 434, and a data out latch ("DATA OUT latch") 446 may be coupled to the sensing circuit 444 to transmit bits from the memory array 448 to the outside as they are read. Through any of the various embodiments, the memory unit 226' can control the transmission of read pulses and write pulses according to one or more operational methodologies.

Figure 5:
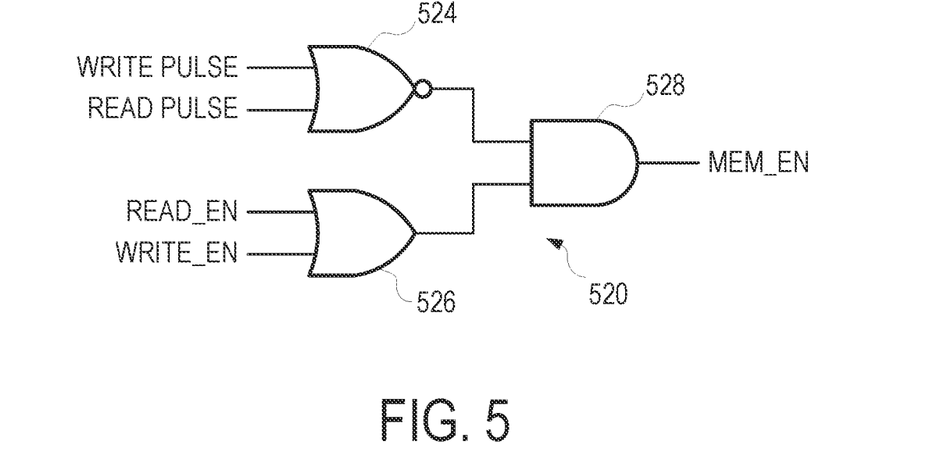
FIG. 5 illustrates a circuit for generating an encoded memory signal according to an embodiments of the present disclosure.
Figure 6:
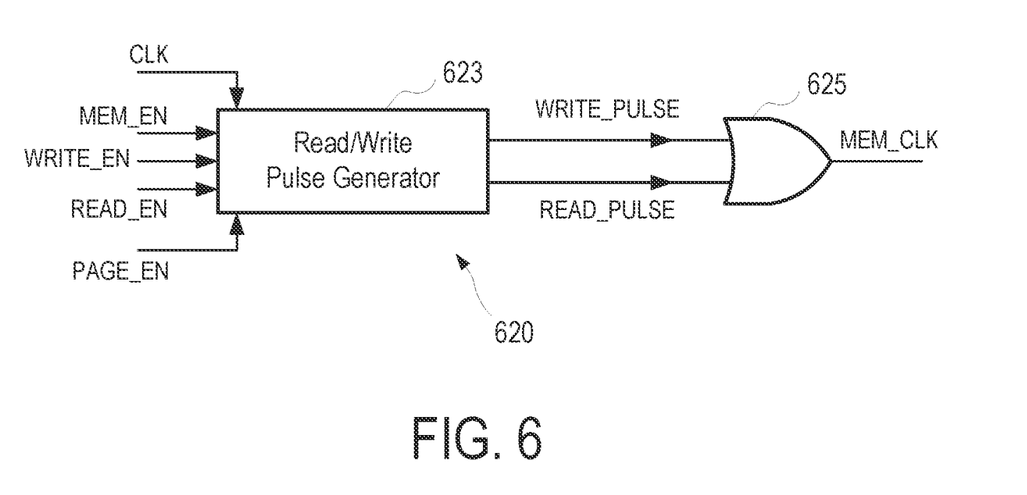
FIG. 6 illustrates a circuit for generating a read pulse or write pulse according to an embodiment of the present disclosure.

FIG. 5 illustrates a circuit 520 for generating an encoded memory signal MEM_EN according to an embodiments of the present disclosure. FIG. 6 illustrates a pulse logic circuit 620 for generating a read pulse or write pulse and a memory clock signal according to an embodiment of the present disclosure. These circuits depict example circuits for generating the read or write pulses to be sent to the memory unit 226 of FIG. 2, to read and write data according to incoming encoded signals (e.g., from the pre-decoder 222 of FIG. 2).

Referring to FIG. 6, the pulse logic circuit 620 may include a read/write pulse generator (simply "pulse generator" hereafter) 623, which receives a clock signal CLK as well as incoming signals in the form of an encoded page signal PAGE_EN, a memory enable signal MEM_EN, and encoded read and write signals READ_EN and WRITE_EN. The clock signal CLK can define an operating frequency for the pulse generator 623, while the encoded read and write signals READ_EN and WRITE_EN may provide instructions for reading and writing data in the memory unit 226, respectively. The encoded page signal PAGE_EN may specify an address for a memory array, e.g., a page or a sub-array, among the memory units 226 of FIG. 2, where operations are to be performed.

Referring to FIG. 5, the circuit 520 generates the encoded memory signal MEM_EN to indicate whether a requested page or sub-array is available to perform the requested read or write operation. The circuit 520 may receive a read pulse or a write pulse in a first logic gate 524 for producing an output at a first logic level (e.g., logic low) when either the write pulse or the read pulse is detected, or a second logic level (e.g., logic high) in the case where neither the read pulse nor the write pulse is detected. The circuit 520 also includes a second logic gate 526 configured to receive the encoded read signal READ_EN or the encoded write signal WRITE_EN in parallel with the read or write pulse delivered to the first logic gate 524. If the second logic gate 526 receives the encoded read signal READ_EN or the encoded write signal WRITE_EN, it can output the second logic level (e.g., logic high) or otherwise outputs the first logic level (e.g., logic low) to indicate the absence of incoming encoded signals.

The encoded read signal READ_EN or the encoded write signal WRITE_EN arrives only if memory portions of the memory unit 226 are available for reading or writing, because encoding of read or write signals only occurs when circuitry is available for the relevant encoding. A third logic gate 528 receives the output from the first logic gate 524 and the second logic gate 526 to produce the encoded memory signal MEM_EN to indicate whether the requested page or sub-array is available to perform the reading or writing for a particular read or write pulse.

Referring back to FIG. 6, the page signal PAGE_EN may be transmitted to the pulse generator 623. If the encoded memory signal MEM_EN indicates that a particular page or sub-array is available for reading or writing, the pulse generator 623 can use the incoming signals to generate a read or write pulse (each shown via READ_PULSE and WRITE_PULSE, respectively) to a logic gate 625, e.g., an "OR" gate. The OR gate 625 can transmit the respective pulse to the memory unit 226 as the memory clock signal MEM_CLK for data processing in a memory system. In the case where the encoded memory signal MEM_EN indicates that the relevant page or sub-array is not available for reading or writing, the pulse generator 623 may not produce any signals for transmission via the memory clock signal MEM_CLK.

Figure 7:
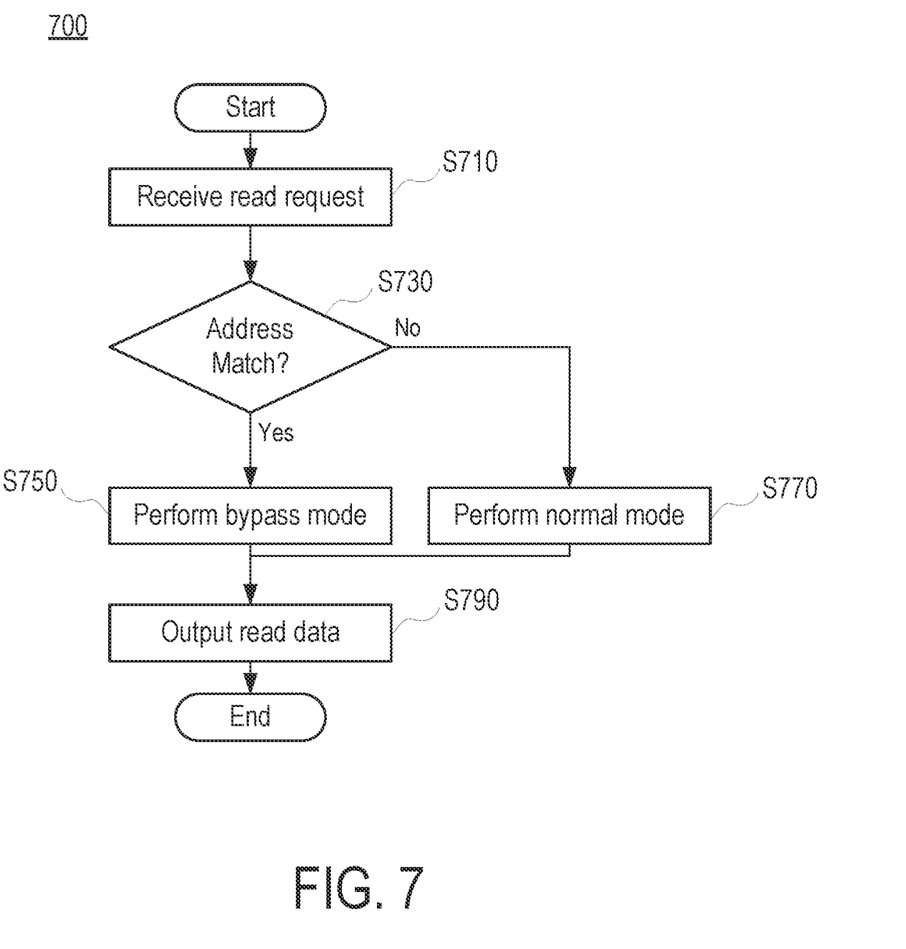
FIG. 7 is a flow chart illustrating an operating method of a memory system according to an embodiment of the present disclosure.

FIG. 7 illustrates a flow chart for a process 700 of operating a memory system according to an embodiment of the present disclosure. The process 700 may be used to operate the memory system 100 shown in FIG. 1, in particular to perform a bypass mode to promptly process read requests and provide high throughput.

At S710, the memory controller 140 receives a read request READ_RQ, i.e., a current read request. The read request READ_RQ has a read address that is an address in the memory device 120.

At S730, the address match circuit 144 of the memory controller 140 searches the write queue 146 for a write request with a write address that matches the read address of the read request READ_RQ. In an embodiment, the address match circuit 144 compares the read address with each write address of write requests stored in the write queue 146. If the same address is located in the write queue 146, the address match circuit 144 determines the address match has been found for the read request READ_RQ. The address match circuit 144 may search for the address match using other methods, as will be understood by those skilled in the art.

If the address match is found, the process goes to S750. The memory controller 140 performs a bypass mode. The address match circuit 144 reads write data of the corresponding write request from the write queue 146 and transmits the write data to the data output circuit 180.

In an embodiment, the read request READ_RQ is not stored in the read queue 142 when the bypass mode is performed since the data has been read out from the write queue 146. The address match circuit 144 provides a first match determination signal $S_{match}$ and instructs the read request queue 142 not to store the read request READ_RQ in the read queue 142, thereby preventing the read request READ_RQ from being performed for the second time after the write data has been written in the memory device 120.

In an embodiment, the bypass mode is performed for the read request READ_RQ while a write operation for a write request, which has a write address different from the write address of the corresponding write request, is performed in the memory device 120, regardless of a processing order of the read request READ_RQ. Therefore, the bypass mode may be called "out-of-order" memory service.

If the address match is not found, the process goes to S770. The memory controller 140 performs a normal mode. The read queue 142 stores the read request READ_RQ therein. The read request READ_RQ is then sent to the memory device 120, so that data associated with the read request READ_RQ can be read out from the memory device 120 and transmitted to the data output circuit 180.

In an embodiment, the address match circuit 144 provides a second match determination signal $S_{match}$ to the read queue 142 to instruct the read queue 142 to store the read request READ_RQ. In another embodiment, the read queue 142 is configured to store the read requests unless the first match determination signal $S_{match}$ is received, so the second match determination signal $S_{match}$ is not utilized.

At S790, the data output circuit 180 outputs the read data to an external node. The read data may be received from the address match circuit 144 via a bypass mode or from the memory device 120 via the normal node.

Figure 8:
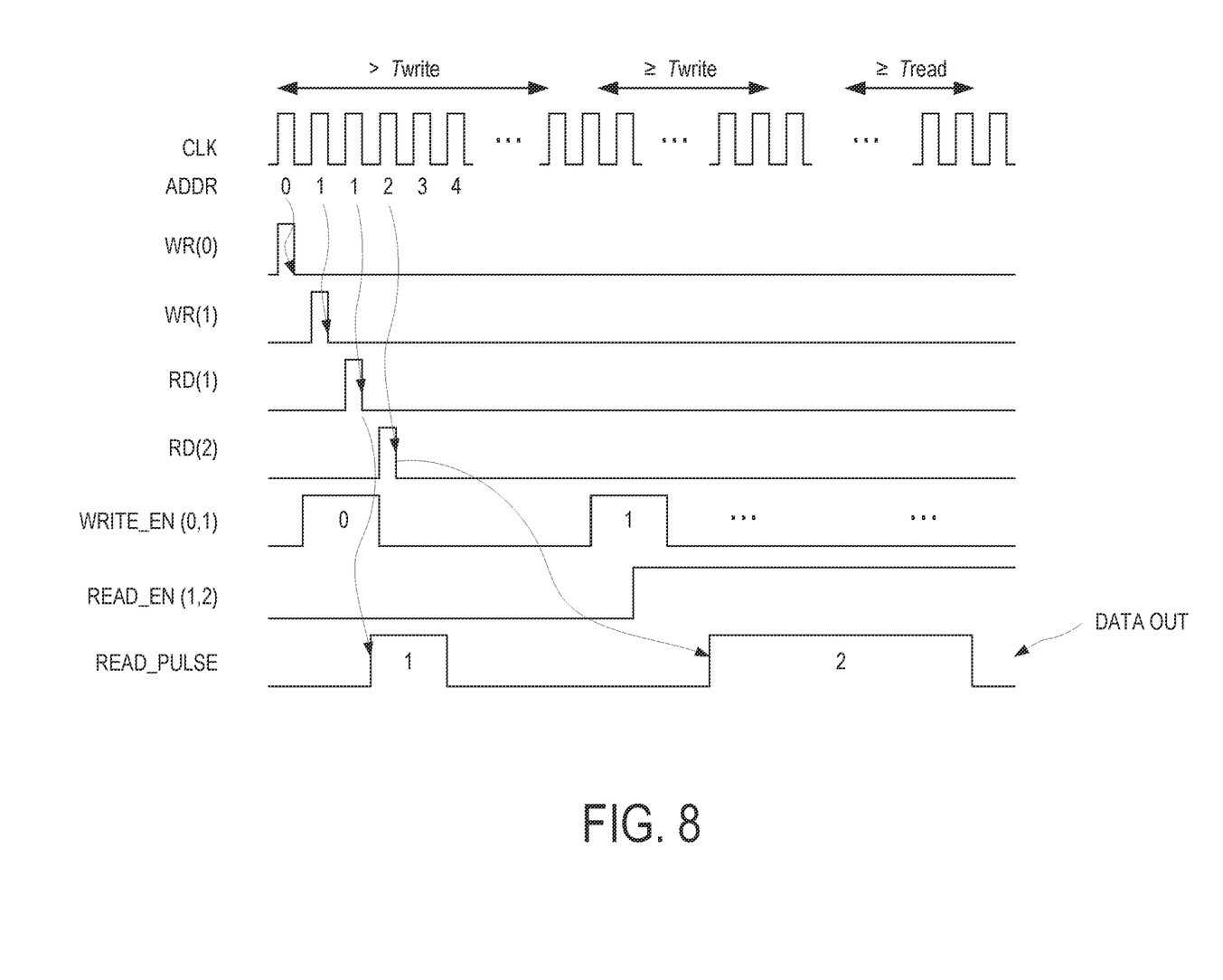
FIG. 8 is a timing diagram illustrating an operating method of a memory system according to an embodiment of the present disclosure.

FIG. 8 illustrates a timing diagram for operating a memory system according to an embodiment of the present disclosure. The operation shown in FIG. 8 may be used for the memory system 100 shown in FIG. 1. The operation shown is an exemplary method for performing a bypass mode in the memory system 100 to obtain high throughput.

A row labeled "ADDR" indicates a memory region to which each read or write request is directed. For example, a first write request WR(0) with an address 0 is directed to a memory region "0," a second write request WR(1) with an address 1 is directed to a memory region "1," a first read request RD (1) with the address 1 is directed to the memory region "1," and a second read request RD (2) with an address 2 is directed to a memory region "2." Those write and read requests are sequentially input to the memory controller 140.

In an embodiment, a write request requires, e.g., a predetermined number of consecutive clock pulses of time to be implemented. In response to the first write request WR(0), an encoded write signal WRITE_EN (0) is enabled, and thus a write operation for the first write request WR(0) is performed in the memory region "0" in response to the encoded write signal WRITE_EN(0). Similar mechanism is applied to each of the other requests, e.g., the second write request WR(1), the first read request RD (1), or the second read request RD (2) when they are processed. For the read request, an encoded read signal READ_EN may be enabled in a normal mode instead of the encoded write signal WRITE_EN. For example, for the read requests RD (1) and RD (2), encoded read signals READ_EN (1,2) are enabled.

While the write operation corresponding to the first write request WR(0) is in progress to the memory region "0" designated by the address 0 within a write latency Twrite in response to the encoded write signal WRITE_EN(0) that is enabled, the second write request WR(1) with the address 1 is queued in the write queue 146. Thereafter, when the first read request RD (1) with the address 1 is input to the memory controller 140, the first read request RD (1) is provided to the address match circuit 144, and the address match circuit 144 searches the write queue 146 for a write request with the address 1 that is the same as the address 1 of the first read request RD (1). In this case, since the second write request WR(1) with the address 1 is queued in the write queue 146, the address match circuit 144 detects the second write request WR(1) with the address 1 in the write queue 146.

When the second write request WR(1) with the address 1 is detected in the write queue 146, the memory controller 140 performs the bypass mode. In the bypass mode, the address match circuit 144 may read out data corresponding to the second write request WR(1) from the write queue 146 and transmit the data to the data output circuit 180. The data output circuit 180 then outputs the data to an external node as read data DATA in response to a read pulse READ_PULSE that is enabled, while the write operation corresponding to the first write request WR(0) is in progress. Since the read data requested by the first read request RD (1) is output to the external node while the write operation corresponding to the first write request WR(0) is in progress, it is possible to reduce a time required to output read responses, so that the memory system 100 can provide high throughput memory responses, by performing the bypass mode.

After the write operation corresponding to the first write request WR(0) is completed and the read data requested by the first read request RD (1) is output to the external node, the request ordering circuit 160 may prioritize next requests, e.g., the second write request WR(1) and the second read request RD (2). FIG. 8 shows a case in which the second write request WR(1) is prioritized over the second read request RD (2). However, in another embodiment, the second read request RD (2) can be prioritized over the second write request WR(1).

Embodiments of the present disclosure may be particularly suitable for circuitry to read or write non-volatile memory (NVM) such as magnetic RAM (MRAM), which otherwise may require more time to read or write than volatile memory. Moreover, the logic for controlling read or write operations of the memory device 120 (e.g., by performing the bypass mode) may be achieved by a combination of logic gates and existing components (e.g., latches, multiplexers, demultiplexers, decoders, etc.) that are already present in a memory structure. Embodiments of the memory system 100 may allow read request(s) to be processed out of order where possible. This may reduce a read response time. These and other attributes of system 100 described herein may require less than a one percent increase in the total surface area needed to implement a RAM architecture, while decreasing latency in the read response time.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As used herein, the terms "configured," "configured to" and/or "configured for" can refer to specific-purpose patterns of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus, comprising:
a memory device including a plurality of memory arrays;
a memory controller configured to control the memory device, the memory controller having a read queue, a write queue, and an address match circuit; and
a data output circuit,
wherein the data output circuit is directly connected to both the memory device and the memory controller,
wherein the memory controller is configured to receive a read request, search the write queue for a write address that matches a read address of the read request, and send data associated with the write address from the write queue to the data output circuit without accessing the memory device when the write address matches the read address, the write address that matches the read address being a target address, and
wherein, when there is the target address in the write queue, the data output circuit is configured to output the data associated with the target address, received from the write queue, to an external device in response to a read pulse that is enabled by the read request, and
wherein, when the target write address is absent in the write queue, the data output circuit is configured to output data associated with the read address, received from the memory device, to the external device in response to the read pulse.

2. The apparatus of claim 1, wherein the address match circuit searches the write queue for the target address and sends the data associated with the target address to the data output circuit, and
wherein the memory device includes a magnetic random-access memory (MRAM) cell.

3. The apparatus of claim 1, wherein the address match circuit sends the data associated with the target address while a write operation for a write request is being performed in the memory device, the write request having a write address different from the target address.

4. The apparatus of claim 1, wherein the address match circuit compares the read address of the read request with each write address of the write requests queued in the write queue to detect the target address.

5. The apparatus of claim 1, wherein the address match circuit provides a first match determination signal to the read queue when a target write request is found in the write queue, the target write request being a write request with the target address and found in the write queue, and
wherein the read queue is configured not to store the read request therein in response to the first match determination signal.

6. The apparatus of claim 1, wherein the address match circuit is configured to provide the data associated with the target address to the data output circuit together with an identifier of the read request.

7. The apparatus of claim 1, further comprising:
a request ordering circuit coupled to the read queue and the write queue, the request ordering circuit being configured to monitor the read queue and the write queue, prioritize the read requests and the write requests based on availability of entries of the write queue, and process the read requests and the write requests according to determined priorities.

8. The apparatus of claim 7, wherein the request ordering circuit is configured to process the read requests before the write requests unless a threshold value is reached in the write queue.

9. The apparatus of claim 8, wherein the request ordering circuit is configured to alternately process the read requests and the write requests when the threshold value is reached in the write queue.

10. The apparatus of claim 1, wherein, when no target address is in the write queue, the memory controller is configured to access the memory device to read out the data associated with the read address from the memory device.

11. A method of operating a memory system that includes a memory controller, a memory device, and a data output circuit directly connected to both the memory device and the memory controller, comprising:
receiving, by the memory controller, a read request, the memory controller having a read queue and a write queue, the memory controller being coupled to both the memory device and the data output circuit;
searching, by the memory controller, the write queue for a write address that matches a read address of the read request;
sending, by the memory controller, data associated with the write address from the write queue to the data output circuit without accessing the memory device when the write address matches the read address; and
controlling, by the memory controller, the memory device to read data associated with the read address and send it to the data output circuit when no write address matches the read address in the write queue; and
outputting, by the data output circuit, the data from the write queue or the memory device to an external device in response to a read pulse that is enabled by the read request.

12. The method of claim 11, wherein the memory device includes a magnetic random-access memory (MRAM) cell.

13. The method of claim 11, further comprising:
queuing, by the memory controller, one or more write requests in the write queue of the memory controller; and
performing, by the memory device, a write operation while performing one or more of the following: the search step, the step of sending the data associated with the write address, and the step of outputting the data from the memory controller.

14. The method of claim 11, wherein the data from the memory controller is sent with an identifier to the data output circuit, the identifier being associated with the read request.

15. The method of claim 11, wherein the memory controller further includes an address match circuit, and
wherein the data from the memory controller is sent to the data output circuit by the address match circuit.

16. The method of claim 11, further comprising:
providing, by the memory controller, a first match determination signal to the read queue when the write address that matches the read address is found in the write queue,
wherein the read queue is configured not to store the read request therein in response to the first match determination signal.

17. The method of claim 11, wherein the memory system further includes a request ordering circuit, the method further comprising:
determining, by the request ordering circuit, processing priorities of one or more read requests queued in the read queue and one or more write requests queued in the write queue based on availability capacity of the write queue; and
dispatching, by the request ordering circuit, the one or more read requests and the one or more write requests to the memory device according to their determined processing priorities.

18. The method of claim 17, wherein the one or more read requests are given priority over the one or more write requests unless the write queue reaches a threshold value.

19. The method of claim 11, further comprising:
storing, by the memory controller, the read request in the read queue when the write address that matches the read address of the read request is not found in the write queue; and
reading, by the memory controller, a storage location on the memory device based on the read request to send the data from the memory device to the data output circuit.

* * * * *